United States Patent [19]

Oeder et al.

[11] 4,417,035

[45] Nov. 22, 1983

[54] EMULSIFIABLE HARD WAXES CONSISTING OF COPOLYMERS OF ETHYLENE WITH UNSATURATED CARBOXYLIC ACIDS

[75] Inventors: Dieter Oeder, Weisenheim; Wolfram Dietsche, Frankenthal; Stefan Weiss, Neckargemuend; Walter Ziegler, Edingen-Neckarhausen; Peter Kueppers, Frankenthal; Albert Hettche, Hessheim, all of Fed. Rep. of Germany

[73] Assignee: BASF Aktiengesellschaft, Rheinland-Pfalz, Fed. Rep. of Germany

[21] Appl. No.: 320,976

[22] Filed: Nov. 13, 1981

[51] Int. Cl.$^3$ .................... C08F 212/02; C08F 220/06
[52] U.S. Cl. .................................... 526/208; 526/317; 562/512
[58] Field of Search ................ 526/317, 208; 562/512

[56] References Cited

U.S. PATENT DOCUMENTS

| | | | |
|---|---|---|---|
| 3,215,657 | 11/1965 | Beresniewicz et al. | 526/317 |
| 3,658,741 | 4/1972 | Knutson et al. | 523/309 |
| 3,801,551 | 4/1974 | Bohme | 526/317 |
| 3,891,603 | 6/1975 | Heil et al. | 526/317 |
| 3,969,297 | 7/1976 | Teer et al. | 526/317 |
| 4,028,436 | 6/1977 | Bogan et al. | 526/317 |
| 4,248,990 | 2/1981 | Pieski et al. | 526/317 |
| 4,252,924 | 2/1981 | Chatterjee | 526/317 |
| 4,253,901 | 3/1981 | Aslakson | 526/317 |

FOREIGN PATENT DOCUMENTS 929643 6/1963 United Kingdom .
963380 7/1964 United Kingdom .

*Primary Examiner*—Harry Wong, Jr.
*Attorney, Agent, or Firm*—Oblon, Fisher, Spivak, McClelland & Maier

[57] ABSTRACT

Water-emulsifiable hard waxes consisting of homogeneous copolymers of ethylene with from 1 to 8% by weight, based on copolymer, of one or more α-olefinically unsaturated $C_3$–$C_8$-carboxylic acids, and having the following characteristic data:

Melt index = 1,500 to 20 MFI units, measured at 160° C. under 325 g load

Acid number = 10–60

Höppler hardness = 400–800 bar, measured at 23° C. by DGF standard method M-III 9a (57).

1 Claim, No Drawings

EMULSIFIABLE HARD WAXES CONSISTING OF COPOLYMERS OF ETHYLENE WITH UNSATURATED CARBOXYLIC ACIDS

The present invention relates to water-emulsifiable hard waxes which have a relatively low acid number and high melt viscosity and which consist of copolymers, prepared by high pressure polymerization, of ethylene with olefinically unsaturated carboxylic acids.

Ethylene/acrylic acid copolymers, and their use as emulsifiable waxes, are known from the literature. British Pat. No. 929,643 describes the preparation of such waxes at polymerization temperatures of from 50° to 250° C. and pressures of from 100 to 2,000 bar by a batchwise method in the presence of free radical initiators and of organic solvents.

German Published Application DAS 1,720,232 discloses a continuous process which gives homogeneous copolymers. This again is operated at about 100°–300° C., but at pressures of at most 150 bar.

In both cases, waxes which have melt viscosities of from 100 to 1,200 mPa.s at 120° C. are obtained. These waxes furthermore have acid numbers of >45, and in most cases even >80, if their emulsifiability is to be adequate.

In contrast, the melt oxidation products of polyethylene, disclosed, for example, in German Pat. Nos. 118,031 and 1,237,783 or French Pat. No. 1,343,962, and also known to constitute emulsifiable synthetic waxes, have acid numbers of only about 15–20, whilst having equally good emulsifiability.

Accordingly, ethylene copolymer waxes had to be produced with the relatively high acid numbers mentioned above if they were to be readily emulsifiable. As a result of such high acid numbers, however, waxes of this type are so hydrophilic—especially if, in addition, they have been neutralized—that they often have to be employed (as an aqueous emulsion) in substantially larger amounts if they are to produce the desired water-repellancy.

On the other hand, there has long been a desire in industry to use specifically the copolymer waxes, since they are more heat stable than the polyethylene oxidation products and are also of more uniform structure—the polar groups they contain are exclusively carboxyl groups, without additional carbonyl groups and peroxy groups, which tend to undergo rearrangement reactions, especially in an alkaline medium—as a result of which differences the copolymer waxes in general remain colorless and odorless even at relatively high temperatures.

In general, waxes employed to form films should give coatings which are not only hard but also tough, scratch-resistant and non-tacky.

It is an object of the present invention to provide waxy copolymers which, in addition to being colorless and odorless, give tough, scratch-resistant and non-tacky films, and in particular, exhibit good emulsifiability even at low acid numbers.

We have found that this object is achieved with the ethylene copolymers according to the invention.

The ethylene copolymers contain from 1 to 8, preferably from 2 to 6, % by weight of units of the α-olefinically unsaturated carboxylic acids. For industrial purposes, products containing from 2.5 to 5% by weight of such units are of particular interest. Examples of the acids of 3 to 8 carbon atoms which are used according to the invention are acrylic acid, methacrylic acid, crotonic acid, maleic acid, fumaric acid and itaconic acid. Acrylic acid and methacrylic acid are industrially preferred.

The copolymers have melt indices of from 1,500 to 20 MFI units, measured at 160° C. under 325 g load. MFi stands for melt flow index. The latter is proportional to the amount of polymer melt, measured in grams, which, at a defined temperature, can be forced through a nozzle of defined dimensions under a defined force or load. The determination of the melt index is based on the following standards: ASTM D 1238-65 T, ISO R 1133-1969 (E) and DIN 53 735 (1970). Preferably, the melt index is from 1,000 to 50 MFI units.

The Höppler hardness is from 400 to 800 bar, preferably from 450 to 650 bar, measured at 23° C. by DGF standard method M-III 9a (57).

The acid number is from 10 to 60, preferably from 20 to 35, ie. substantially less than for the lower-viscosity copolymer waxes hitherto proposed.

In comparable waxes of the prior art, substantially higher acid numbers were needed to produce non-creaming, speck-free and transparent emulsions, as is shown by our experimental results, given later.

The waxes are prepared in a conventional manner by continuous high pressure copolymerization of ethylene with the unsaturated carboxylic acids in the presence of a free radical initiator. The polymerization is carried out at from 150° to 300° C. under a pressure of from 1,000 to 3,000 bar. The weight ratio of ethylene to unsaturated carboxylic acid is from 500:1 to 20:1; the batch contains from 0.01 to 5% by weight, based on total monomers, of a regulator.

The regulator employed is one of the conventional substances which exert this type of action. Such substances include, for example, aliphatic aldehydes of 3 to 6 carbon atoms, eg. propionaldehyde and n-butyraldehyde, aliphatic ketones of 3 to 6 carbon atoms, eg. acetone and methyl ethyl ketone, α-olefins of 3 to 6 carbon atoms, eg. propene, 1-butene and 1-pentene, and $C_3$–$C_6$-alkanes, eg. propane, n-butane and n-pentane. Aliphatic aldehydes, eg. propionaldehyde and n-butyraldehyde, are preferred.

The continuous reaction is taken to 3–25% conversion of the ethylene and the polymer formed is removed continuously from the reaction zone.

The polymerization is carried out in a single-phase polymerization medium, the ethylene present in the supercritical state acting as a solvent for the reaction mixture and for the polymer melt. An additional solvent, as referred to for the preparation of ethylene/acrylic acid waxes in German Published Application DAS 1,720,232, is not employed.

In preparing the hard waxes, the correct dosage of acrylic acid, regulator and initiator is important, since disadvantages such as too high a molecular weight, poor emulsifiability, lower hardness and consequently poorer film-forming properties may otherwise be encountered.

The process disclosed in German Published Application DAS 1,520,497 is at first sight very similar. This process is also carried out continuously, but without addition of a regulator and preferably in the presence of a solvent, such as benzene. However, the products obtained have adhesive properties and are suitable for use as, for example, fiber binders, ie. they are substances which are unsuitable for use as hard waxes intended to give non-tacky films.

Accordingly, it was surprising that a similar chemical process should be capable of giving products having such different technological properties.

The products were obtained by continous copolymerization of ethylene and $\alpha,\beta$-ethylenically unsaturated acids of 2 to 8 carbon atoms at from 150° to 300° C. under high ethylene pressures, namely 1,000–3,000 bar. The polymerization takes place in a single-phase polymerization medium, with ethylene conversions of at most 25%, and the ethylene, present in the supercritical state, serves as a solvent for the reaction mixture and for the polymer solution.

An additional solvent is not used, contrary to the method of preparation of ethylene/acrylic acid waxes described in German Published Application DAS 1,720,232. The $\alpha,\beta$-ethylenically unsaturated acids and the free radical polymerization initiator must be introduced separately into the reaction mixture. The regulator required for control of the molecular weight can be introduced together with the comonomers or together with the free radical initiator.

The Examples which follow illustrate the invention without implying any limitation.

EXAMPLE 1

A mixture of 318 kg/h of ethylene, 1.9 kg/h of acrylic acid and 0.71 kg/h of propionaldehyde is passed continuously, at 35° C., through a 15 liter stirred autoclave kept at a pressure of 2,300 bar. The temperature in the autoclave is kept at 240° C. by continuous addition of 23.5 g/h of tert.-butyl perisononanate, TBIN (as a rule in a suitable solvent). The polymer, which, after expansion of the reaction mixture, is obtained in an amount of 54.5 kg/h corresponds to a coversion of 17.1% (based on ethylene throughput). It contains 3.1% by weight of acrylic acid and has a melt index (MFI 160/325) of 260. The Höppler hardness is 600 bar, the solidification point 98° C., and the iodine color number is 1, measured after 30 minutes in a melt at 150° C.

Examples 2 to 14 employ a similar procedure to that of Example 1; Table I shows the different preparation conditions and the product parameters.

EXAMPLE 13

To emulsify the granular wax described in Example 1, 20 parts of wax, 4 parts of a non-ionic emulsifier (alkylphenol oxyethylate containing 8–10 ethylene oxide (EO) units, $C_9$–$C_{11}$ straight-chain or branched fatty alcohols reacted with 7 EO units or $C_{13}$–$C_{15}$ straight-chain or branched fatty alcohols reacted with 10 EO units), 0.3 part of potassium hydroxide, 0.72 part of ethylene glycol and 30 parts of water were stirred at 130°–140° C. under pressure (5–6 bar) to give a homogeneous mixture. A further 44 parts of water were then added, with stirring, and the stirring was continued for 15 minutes. The wax emulsion was now cooled rapidly (the preferred method being to discharge the emulsion, which is under pressure, via a high-efficiency cooler). After having been cooled to room temperature, the emulsion is found to be speck-free.

Diluted to 1% strength, the emulsion shows a light transmission of 66% in a 1 cm cell. After standing for 2 months, the emulsion is still free from any creaming. Smears on a glass plate are film-forming at room temperature; speck-free, clear, glossy, tough, non-tacky films, of the type described in the polishes sector, are obtained.

EXAMPLE 14

To emulsify the granular wax described in Example 2, 25 parts of wax, 4.5 parts of an alkylphenol oxyethylate containing 9 EO units, 0.375 part of potassium hydroxide, 0.9 part of ethylene glycol and 28 parts of water were introduced into a pressure autoclave equipped with a propeller stirrer. The mixture was heated to 120°–140° C. with stirring and after the components had formed a homogeneous melt a further 41 parts of water were added under pressure. The mixture was again heated to 130° C., stirred for a further 10–20 minutes and then cooled rapidly to room temperature, with slight stirring.

The wax emulsion obtained was speck-free and showed a light transmission of 60% in 1% strength dilution. No creaming of the emulsion was observable

TABLE I

| Example No. | Pressure bar | $T_{max}$ °C. | $T_{mixture}$ °C. | Ethylene throughput, kg/h | AA+ feed rate kg/h | PA+ feed rate kg/h | TBIN feed rate g/h | Output kg/h | Conversion % | AA content, % by weight | Melt index [MFI] 160/325 | Hardness bar 23° C. | Iodine color number | Solidification point °C. |
|---|---|---|---|---|---|---|---|---|---|---|---|---|---|---|
| 2 | 2,200 | 220 | 35 | 305 | 1.5 | 0.78 | 13.4 | 47.1 | 15.4 | 2.9 | 200 | 620 | 1 | 102 |
| 3 | 2,200 | 219 | 35 | 295 | 2.0 | 0.75 | 13.7 | 45.8 | 15.5 | 3.9 | 220 | 630 | 1 | 100 |
| 4 | 2,300 | 240 | 35 | 307 | 1.7 | 0.25 | 14.0 | 53.0 | 17.3 | 2.9 | 57 | 570 | 1 | 100 |
| 5 | 2,300 | 240 | 35 | 288 | 2.4 | 0.48 | 19.8 | 50.0 | 17.4 | 4.2 | 187 | 480 | 1 | 98 |
| 6 | 2,300 | 220 | 35 | 268 | 1.9 | 0.74 | 9.5 | 43.0 | 16.0 | 4.0 | 252 | 580 | 1 | 100 |
| 7 | 2,200 | 219 | 35 | 290 | 2.5 | 0.82 | 14.2 | 45.4 | 15.7 | 4.9 | 205 | 610 | 1 | 99 |
| 8 | 2,200 | 219 | 35 | 308 | 1.6 | 1.55 | 13.5 | 47.4 | 15.4 | 3.1 | 970 | 400 | 1 | 96 |
| 9 | 2,200 | 219 | 35 | 305 | 2.3 | 1.43 | 13.8 | 47.5 | 15.6 | 4.3 | 1,000 | 480 | 1 | 98 |
| 10 | 2,300 | 221 | 35 | 296 | 1.7 | 0.47 | 12.4 | 46.1 | 15.6 | 3.4 | 22 | 550 | 1 | not determinable |
| 11 | 2,300 | 220 | 35 | 228 | 1.8 | 0.87 | 12.7 | 44.8 | 15.5 | 3.6 | 264 | 650 | 1 | 99 |
| 12 | 2,300 | 220 | 35 | 305 | 20 | 0.77 | 11.5 | 47.5 | 15.6 | 3.8 | 160 | 630 | 1 | 99 |

+AA = acrylic acid
PA = propionaldehyde

The wax samples prepared in Experiments 1–12 were emulsified with non-ionic emulsifiers, such as alcohol oxyethylates or alkylphenol oxyethylates, in the presence of an alkali, to give highly transparent emulsions.

The Examples which follow describe the details.

even after 2 months' storage. Smears on a glass plate dried to give speck-free, clear, tough, glossy and non-tacky films.

EXAMPLE 15

20 Parts of the wax of Example 4, 4 parts of isodecyl alcohol oxyalkylated with 7 EO, 0.3 part of potassium hydroxide, 1 part of diethylethanolamine and 30 parts of water were introduced into a 1 liter pressure autoclave equipped with a propeller stirrer and stirred at 120°–130° C., under autogenous pressure, to give a melt. 45 parts of water were then added under pressure. Stirring was continued briefly and the mixture was then cooled to 40° C., with moderate stirring.

The wax emulsion obtained was speck-free and had a light transmission of 63%. No creaming was detectable even after 2 months' storage. Smears on glass plates dried to give speck-free, clear, tough, glossy and non-tacky films.

EXAMPLE 16

160 Parts of wax from Example 10, 40 parts of decyl alcohol oxyalkylated with 7 EO, 3.5 parts of potassium hydroxide, 1.5 parts of sodium bisulfite and 175 parts of water were introduced into a 1 liter pressure autoclave and stirred at 130° C. to give a homogeneous melt. A further 263 parts of water were then added under pressure. Stirring was continued for 15 minutes and the mixture was then cooled to 40° C.

A very transparent emulsion, having a light transmission of 85%, was obtained. The emulsion is stable on storage and no creaming was observed after 2 months. Smears on a glass plate dried to give speck-free, clear, tough, glossy and non-tacky films.

Other waxes according to the invention were also emulsified by the method of Example 13. The results are shown in Table II.

TABLE II

| Example | Wax from Example No. | Light transmission of the emulsion | Stability and film-forming properties of the wax emulsion |
|---|---|---|---|
| 17 | 3 | 65% | no creaming after 8 weeks' storage; clear, glossy, tough, non-tacky film |
| 18 | 8 | 58% | as Example 17 |
| 19 | 11 | 62% | as Example 17 |
| 20 | 7 | 70% | as Example 17 |

Table III shows the results of emulsifying some prior art low molecular weight waxes by the emulsifying method of Example 13.

TABLE III

| Example | Type of wax | MFI 325 g/ 160° C. | AA % | Light transmission of the emulsion % | Stability of the emulsion, and film-forming properties |
|---|---|---|---|---|---|
| 21 | standard market product | 4,500 | 5.5 | 52 | creamed emulsion/increased creaming after 8 weeks, film slightly tacky |
| 22 | market product | 6,500 | 6 | 65 | speck-free emulsion, tacky film |
| 23 | wax prepared by the method of Example 1, but of low molecular weight | 10,250 | 3.4 | 3 | specky, cloudy emulsion, much creaming after 1 day |
| 24 | wax prepared by the method of Example 1, but of low molecular weight | 4,750 | 2.9 | 0 | emulsion breaks immediately |

The waxes according to the invention are in general employed in industrial chemistry, in the textile industry, in plastics processing and especially in the polishes sector. In primary dispersions of the styrene/acrylic acid/acrylate type, the addition of 1–40% of the wax emulsions produces, an linoleum or PVC floor-coverings, very glossy and scratch-resistant films having substantial advantages over prior art products.

The Examples which follow illustrate this effect without implying any limitation.

General Experimental Method

60 Parts of the wax emulsion according to the invention, 10 parts of a primary dispersion of the styrene/acrylic acid/acrylate type, 17 parts of water, 13 parts of a 15% strength resin solution, 0.3 part of tributoxyethyl phosphate, 0.2 part of tributyl phosphate and 1 part of fluorine-containing surfactant.

The polish mixture is applied to a standard PVC floor-covering by means of a fine bristle paintbrush. At room temperature, the emulsion forms a glossy, tough film of polish, whose gloss is determined by means of the Dr. Lange Universal Reflectometer, with 85° measuring head. A wax film on a black plate is used as a gloss calibration standard of 50.

The scratch resistance, roughness and soiling of the film is tested by applying a film to white PVC and subjecting it to black heel marks. The retention of black heel rubber and the tearing of the film are assessed. 1 means no retention of black heel rubber and no damage to the film, whilst 5 means intense black heel marks and tearing of the polymer film.

TABLE IV

| Example | Emulsion from Example | Gloss 1st coat | Gloss 2nd coat | Black soiling | Film damage by heel |
|---|---|---|---|---|---|
| 25 | 13 | 21 | 40 | 2 | 1 |
| 26 | 14 | 20 | 38 | 2 | 1 |
| 27 | 17 | 19 | 39 | 2 | 1 |
| 28 | 18 | 17 | 36 | 2–3 | 2 |
| 29 | 16 | 20 | 40 | 2 | 1 |

TABLE V

Comparative Experiments

| | | | | | |
|---|---|---|---|---|---|
| 30 | 21 | 15 | 30 | 3 | 3 |
| 31 | 22 | 14 | 28 | 3–4 | 3 |
| 32 | Emulsion of oxidized polyethylene wax (standard market product) | 12 | 27 | 4 | 3 |

We claim:
1. A water-emulsified hard wax comprising a homogeneous copolymer of ethylene with about 2.5 to 5% by weight, based on copolymer, of acrylic acid or methacrylic acid and having the following characteristics:

Melt index = 1,500 to 20 MPI units, measured at 160° C. under 325 g load

Acid number = 20–35

Hoppler hardness = 450–650 bar, measured at 23° C. by DGF standard method M-III 9a (57), prepared by continuous copolymerization of ethylene with acrylic or methacrylic acid in the presence of a free radical initiator at about 150° to 300° C. under a pressure of from 1,000 to 3,000 bar, using a weight ratio of ethylene to acid of about 500:1 to 20:1, in a single-phase polymerization medium in which ethylene is present in supercritical state and acts as a solvent and in the presence of about 0.01 to 5% by weight, based on total monomers, of a regulator selected from the group consisting of an aliphatic aldehyde of 3–6 carbon atoms and an aliphatic ketone of 3–6 carbon atoms, thereby converting from about 3 to 25% by weight of ethylene and continuously removing the copolymer formed therefrom.

* * * * *

UNITED STATES PATENT AND TRADEMARK OFFICE
CERTIFICATE OF CORRECTION

PATENT NO. : 4,417,035

DATED : November 22, 1983

INVENTOR(S) : Oeder et al

It is certified that error appears in the above-identified patent and that said Letters Patent is hereby corrected as shown below:

On the title page add:

--[30] Foreign Application Priority Data

November 26, 1980  Germany..... 30 44 519 --.

Signed and Sealed this

Seventeenth Day of January 1984

[SEAL]

Attest:

GERALD J. MOSSINGHOFF

Attesting Officer

Commissioner of Patents and Trademarks